F. E. SPENCER.
NUT LOCK.
APPLICATION FILED DEC. 12, 1911.
1,019,097.
Patented Mar. 5, 1912.
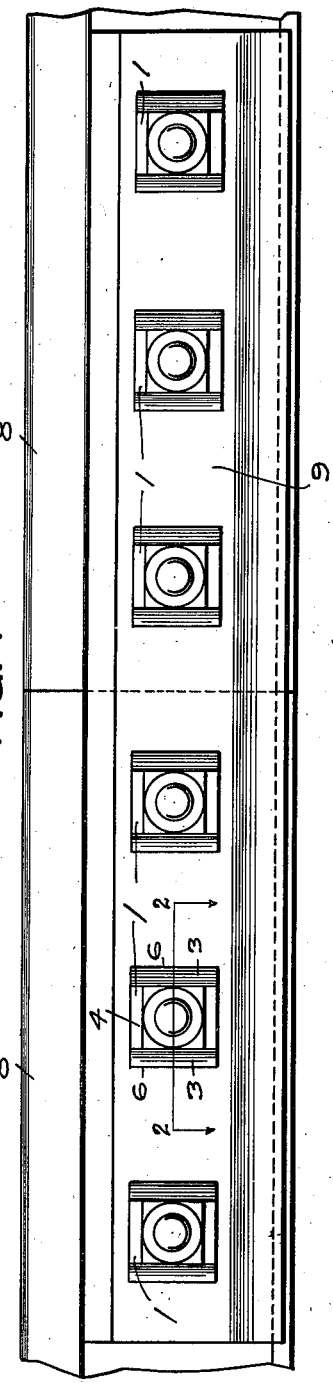
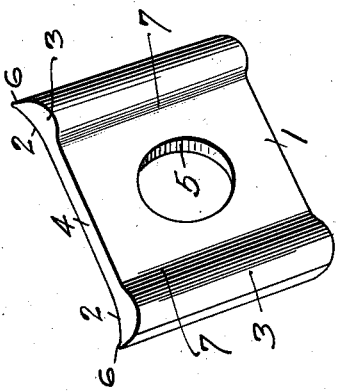
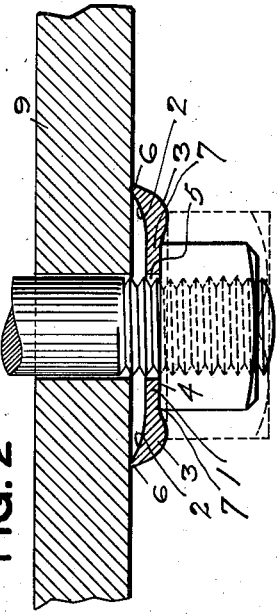
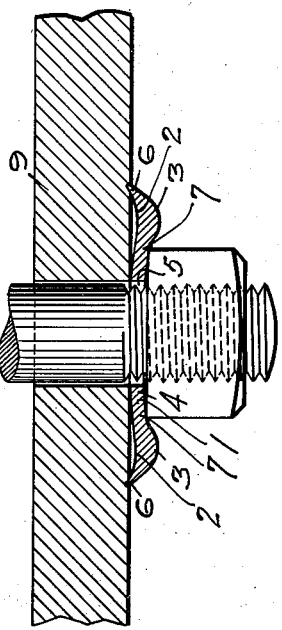
WITNESSES.
J. R. Keller
Robert C. Totten
INVENTOR.
Frank E. Spencer
By Kay & Totten
attorneys

UNITED STATES PATENT OFFICE.

FRANK E. SPENCER, OF THOMBURG, PENNSYLVANIA.

NUT-LOCK.

1,019,097. Specification of Letters Patent. Patented Mar. 5, 1912.

Application filed December 12, 1911. Serial No. 665,368.

*To all whom it may concern:*

Be it known that I, FRANK E. SPENCER, a citizen of the United States, and resident of Thomburg, in the county of Allegheny and State of Pennsylvania, have invented a new and useful Improvement in Nut-Locks; and I do hereby declare the following to be a full, clear, and exact description thereof.

My invention relates to nut locks and is concerned with a device of this character adapted particularly though not exclusively for use with rail joints.

The invention has for its object to provide a simple and economical device for insuring the secure fastening of a bolt nut and which consists of a single element acting both as a nut lock and a washer for the nut.

In the drawings which illustrate a preferred embodiment of my invention, Figure 1 is a fragmentary view in side elevation of a rail joint illustrating one manner of applying my invention. Fig. 2 is a sectional view on the line 2—2 Fig. 1 showing the position of the nut lock before the nut is finally turned up. Fig. 3 is a view similar to Fig. 2 showing the parts after the nut has been tightened up and Fig. 4 is a perspective view of the combined nut lock and washer.

In the embodiment of my invention herein selected for illustration, the nut lock comprises a washer 1 which may be cut from a rolled strip or bar of spring steel of the cross section indicated. The under side of the combined washer and nut lock is arched as at 2—2, and the upper face is provided with the locking ridges 3—3 joined by the web 4 in which is the bolt aperture 5. The opposite sides of the nut lock parallel with the ribs 3—3 are shaped to produce more or less sharp edges 6—6 adapted to bite into the face of the surface upon which the washer rests.

The space between the ribs 3—3 is of such width that when the nut is finally turned up tight the parallel edges of the head thereof will lie just within these ridges whereby the nut will be securely held in the position to which it is turned. In turning up the nut against this combined lock or washer, the corners of the head ride over these ridges as indicated in dotted lines Fig. 2 and as the nut is turned up the central web of the lock member is gradually forced inward until it lies substantially flat against the surface of the article to be clamped, as shown in Fig. 3. The reduced thickness of the web 4 compared with that of the ribs 3—3 causes the web to bend inwardly substantially along the lines 7—7 under the pressure of the nut so that the web may be firmly clamped against the article while the resilience of the combined lock and washer as a whole is retained.

The first effect of turning up the nut is to cause the biting edges 6—6 to bed themselves slightly within the face of the article to be clamped. The further turning up of the nut would apparently cause these biting edges to spread, but by the peculiar curvature of the lower face of the lock member and the distribution of the thickness thereof, this spreading tendency is counteracted by the downward or inward bending of the web 4 so that the final effect is to cause the biting edges 6 to penetrate to a greater depth within the face of the article to be clamped. In short the biting edges instead of spreading appear to turn about their lines of contact with the articles to be clamped, this being permitted by the abrupt thinning of the sides of the lock along the base line 7—7 of the locking ridges 3—3.

It is to be understood that the web 4 of this lock is to be made of steel of sufficient elasticity to permit of the more or less abrupt bending along the lines 7—7, but at the same time the web is made of sufficient thickness so that the device will not be permanently distorted by the tightening up of the nut. Furthermore it is to be noted that the locking ridges 3—3 are formed not by corrugating the device but by thickening the sides. Again it will be observed that these thickened portions, or the ridges 3—3, although located slightly within the line of the biting edges 6—6 are nevertheless sufficiently close to these biting edges to reinforce them and cause them to bite throughout their lengths into the article clamped. In other words, these thickened ridges perform the functions of reinforcing trusses for the biting edges. It will be seen therefore that by combining these locking ridges and biting edges these parts mutually react upon each other to enable each to perform its function more effectively.

While I have illustrated this invention in Fig. 1 as applied to a rail joint in which the rails 8 are bound together by splice plate 9, it is to be understood that the invention is equally applicable wherever it is necessary to secure a bolt and nut against accidental loosening from vibrations. Furthermore this nut lock may be advantageously used against a wood surface where the biting edges 6 will grip firmly within the material.

While I have herein described the particular embodiment of my invention and have specified certain dimension, it is to be understood that the invention may be altered in details within the scope of the appended claims.

What I claim is:

1. A combined nut lock and washer concave upon one face to provide biting edges, and having a flat bearing surface at the opposite side and locking ribs at the opposite sides of said bearing face.

2. A combined nut lock and washer having one face concave to provide opposite biting edges and having a flat bearing face at the opposite side, locking ribs extending along opposite sides of said bearing face, said locking ribs being parallel with said biting edges.

3. A combined nut lock and washer having one face concave to form opposite biting edges, and having a flat bearing surface upon the opposite face, the edges of said washer being thickened opposite said biting edges to form locking ribs for the nut and to reinforce said biting edges.

4. A combined nut lock and washer having one face arched adjacent opposite edges to form biting edges and having locking ribs opposite said biting edges, the space between said ribs being thinned to form a flat bearing surface for the nut.

5. A combined nut lock and washer having opposite biting edges at one face and having locking ribs on the opposite face parallel with and closely adjacent to said edges, a portion of the washer between said ribs being thinned and having a flat bearing face for the nut.

In testimony whereof, I the said FRANK E. SPENCER, have hereunto set my hand.

FRANK E. SPENCER.

Witnesses:
ROBERT C. TOTTEN,
JOHN F. WILL.